US006520405B1

(12) United States Patent
Braxter

(10) Patent No.: US 6,520,405 B1
(45) Date of Patent: Feb. 18, 2003

(54) MAILBOX LOCK

(76) Inventor: Lorenzo C. Braxter, 1520 Curtis St., Selma, AL (US) 36703

( * ) Notice: Subject to any disclaimer, the term of this patent is extended or adjusted under 35 U.S.C. 154(b) by 0 days.

(21) Appl. No.: 09/950,685

(22) Filed: Sep. 13, 2001

(51) Int. Cl.[7] .................... B65G 11/04

(52) U.S. Cl. .................... 232/45; 70/2; 70/6; 70/161

(58) Field of Search .................... 232/44, 45, 17; 70/20, 60, 159, 160, 161, 162

(56) References Cited

U.S. PATENT DOCUMENTS

| | | | | | |
|---|---|---|---|---|---|
| 533,442 | A | | 2/1895 | Deibert | |
| 564,515 | A | * | 7/1896 | Glover | 70/13 |
| 1,004,758 | A | * | 10/1911 | Ebbert | 70/427 |
| 1,471,364 | A | * | 10/1923 | Schrock | 232/35 |
| 2,267,072 | A | * | 12/1941 | Beggs | 232/17 |
| 3,502,261 | A | * | 3/1970 | Solis | 232/17 |
| 3,802,619 | A | | 4/1974 | Vanderveer | |
| 3,965,705 | A | | 6/1976 | Nadler | |
| 4,726,512 | A | | 2/1988 | White | |
| 4,753,386 | A | * | 6/1988 | Phillion, Sr. | 232/43.1 |
| 4,793,163 | A | * | 12/1988 | MacFarlane et al. | 70/2 |
| 5,407,126 | A | | 4/1995 | Coultas et al. | |
| 5,476,220 | A | | 12/1995 | Cohoon | |
| 5,586,718 | A | | 12/1996 | Speece | |
| 5,617,993 | A | * | 4/1997 | Morris | 232/27 |
| 5,624,071 | A | * | 4/1997 | Sosan | 232/17 |
| 5,692,674 | A | | 12/1997 | Wicker | |
| 5,921,117 | A | | 7/1999 | Illguth | |
| 5,934,111 | A | * | 8/1999 | Hernandez | 70/2 |
| 6,047,573 | A | * | 4/2000 | Martinez | 70/58 |

* cited by examiner

*Primary Examiner*—William L. Miller
(74) *Attorney, Agent, or Firm*—Jacobson Holman PLLC

(57) ABSTRACT

A lock for a rural mailbox which enables normal access to the mailbox by a postal delivery person when placing mail in the box and enabling the mailbox door to be closed and locked by the postal delivery person without the use of a key or any other device to protect the mail that is in the box. The postal customer must use a key to open the lock to gain access to the protected mail.

3 Claims, 2 Drawing Sheets

MAILBOX LOCK

BACKGROUND OF THE INVENTION

1. Field of the Invention

The present invention relates to mailboxes having a pivotal access door such as a rural mailbox in which the door pivots at a lower edge thereof and a friction latch retains it in closed position. More specifically, the present invention relates to a novel and unique locking device associated with a mailbox which enables normal access to the mailbox by a mail delivery person when placing mail in the box and enabling the mailbox door to be closed and locked by the locking device without the use of a key to protect the mail that is in the box from theft. A key is required to open the locking device to gain access to the protected mail.

2. Description of the Prior Art

Theft of mail from mailboxes has long been a problem encountered by postal customers. Theft of checks and other important mail is especially important in rural areas where the rural mailbox alongside the road is not visible to the postal customer. Accordingly, many efforts have been made to provide a secure, theft proof mailbox including various types of locking mechanisms and other structures to prevent access to the mail once it has been deposited in the mailbox by the mail delivery person. The following U.S. patents known to Applicant disclose various types of locking devices associated with mailboxes or other containers.

| | | |
|---|---|---|
| 533,442 | 4,726,512 | 5,586,718 |
| 3,802,619 | 5,407,126 | 5,692,674 |
| 3,965,705 | 5,476,220 | 5,921,117 |

While the above patents disclose various types of security measures for mailboxes and the like, they do not disclose a relatively simple structure that can be easily installed on a conventional rural mailbox without substantial modification of the mailbox and which will provide unobstructed access to the mailbox by a mail delivery person when inserting mail into the box and which is quickly and easily locked by merely turning a lock device, without the use of a key or any other tool, once the mail has been placed in the mailbox thus securely locking the mailbox and preventing access thereto by anyone that does not utilize an appropriate key.

SUMMARY OF THE INVENTION

The mailbox lock constructed in accordance with the present invention includes a hasp constructed of three segments which are pivotally connected. One of the segments of the hasp is secured to the top area of the mailbox adjacent the open end thereof. The second or intermediate segment of the hasp overlies the first segment to prevent access to the structure which fastens the first segment to the mailbox and extends beyond the first segment into overlying relation to an upper edge portion of the mailbox door. The third segment extends downwardly from the outer end of the second segment and extends downwardly in front of an upper portion of the mailbox door. The third segment which overlies the portion of the outer surface of the upper end portion of the mailbox door is provided with an opening therein having a unique asymmetrical configuration which enables the third segment to move inwardly of a rotatable lock member having the same configuration as the opening to a position that enables the lock member to be rotated a quarter turn to engage the outer surface of the third segment laterally of the opening to secure the third segment in locked position inwardly of the rotatable lock member. The lock member is rotatably affixed to a post that is attached to the upper end portion of the door thereby maintaining the door in closed position. The rotatable lock member and post include a key operated lock which is effective to enable the lock member to rotate from an unlocked position to a locked position without using a key but requiring a key to rotate the lock member from a locked position back to an unlocked position.

This structure enables all segments of the hasp to be positioned in a generally straight alignment against the upper surface of the mailbox so that the mailbox door can be opened without any impediment from the hasp. After mail has been placed in the mailbox and the door closed, the second and third segments of the hasp are swung upwardly and forwardly and the third segment of the hasp swung downwardly with the lock member on the door passing through the opening in the third segment and being partially rotated by a mail delivery person to a locking position transversely of the opening without use of a key. The mailbox is then securely locked and in order to gain access to the interior of the mailbox, it is necessary for a key to operate the key operated lock to return the rotatable lock member to unlocked position.

Accordingly, an object of the present invention is to provide a locking device for a rural-type mailbox or similar container utilizing a sturdy but yet simply constructed hasp which can be easily attached to a mailbox by using readily available tools and easily manipulated fastening devices and requiring a minimum modification of the mailbox structure.

Another object of the invention is to provide a mailbox lock utilizing a three segment hasp mounted on the mailbox on an upper surface area thereof adjacent the open end of the mailbox and a rotatable lock member mounted on a post fixedly mounted on the mailbox door adjacent an upper end thereof with the segments of the hasp overlying fastening devices which secure the hasp and post to the mailbox when the third segment of the hasp is in locking engagement with the lock member mounted on the post on the door.

A further object of the invention is to provide a lock for mailboxes in accordance with the preceding objects in which the third segment of the hasp includes an asymmetrical opening through which a rotatable lock member having a configuration corresponding to the shape of the opening extends when the third segment of the hasp is in vertical position outwardly of the door. Rotational movement of the lock member results in portions of the lock member overlying outer surfaces of the third segment of the hasp with such rotational movement to a locking position requiring only that the lock member be manually rotated a partial revolution without requiring the use of any key or other device.

A still further object of the invention is to provide a mailbox lock in which the lock member, when rotated to a locked position by a mail delivery person will automatically become locked in locked position to securely protect the mail within the box with a key being required for a postal customer to move the lock member from the locked position back to an unlocked position to enable access to the mail in the box.

Yet another object of this invention to be specifically enumerated herein is to provide a mailbox lock in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
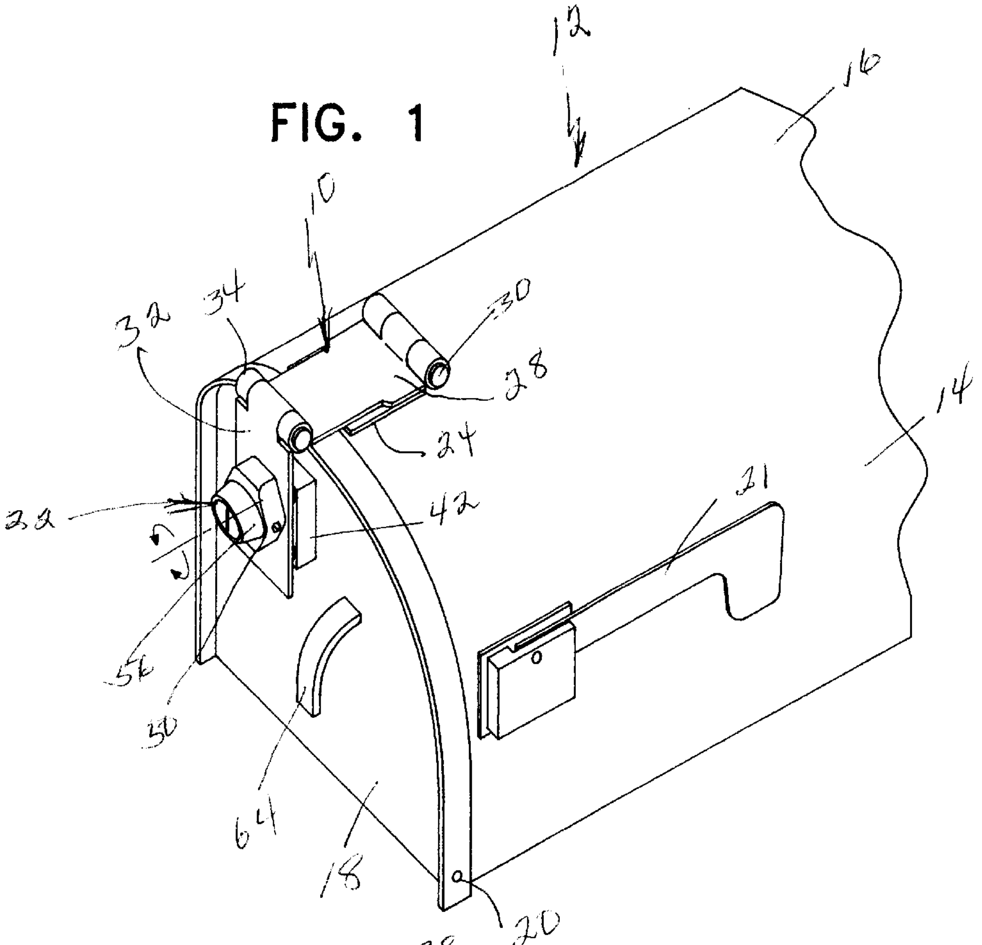
FIG. 1 is a perspective view of a rural mailbox with the lock of the present invention mounted thereon and illustrating the limited rotational movement of the rotatable lock member between locked and unlocked positions.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Referring now to the drawings, the mailbox lock of the present invention is generally designated by reference numeral 10 and is illustrated in installed relation on a conventional rural-type mailbox generally designated by reference numeral 12 in FIG. 1.

The mailbox 12 includes a longitudinally extending peripheral wall 14 having an arcuately curved upper portion 16 and an open front having a correspondingly shaped door 18 pivotally connected to the lower edges thereof by pin structures 20 to enable the mailbox door 18 to be pivoted downwardly to a generally horizontal or downwardly depending relation to the mailbox 12 to provide access to the interior of a mailbox in a manner well known. The mailbox also includes a signal flag 21 mounted thereon and the mailbox can be supported by a suitable post or other structure alongside a roadway to enable a mail delivery person in a vehicle to place mail in the mailbox in a well known manner.

The mailbox lock 10 includes a hasp generally designated by reference numeral 20 that is attached to the upper curved portion 16 of the mailbox 12 adjacent the door 18. The lock 10 also includes a locking device generally designated by reference numeral 22 which is secured to the front surface of the door 18 adjacent the upper curved edge thereof.

The hasp 20 includes a first rectangular segment 24 secured to the upper curved surface 16 closely adjacent the open end thereof and closely adjacent the door when the door is closed. A plurality of fasteners 26 extend through the first segment 24 of the hasp 22 and through the curved top surface 16 of the mailbox 12. Retaining nuts may be provided on the inner end of the fasteners 26 or alternatively, the first segment may be permanently secured to the mailbox by welding, epoxy or other fastening means. Pivotally attached to the first segment 24 of the hasp 20 is a second or intermediate segment 28 connected to the first segment 24 by a hinge structure 30 which defines a hinge axis transverse of the hasp and is a conventional pin and barrel hinge. Attached to the outer end of the second segment 28 of the hasp 20 is a third segment 32 of the hasp which is connected to the second segment 28 by a hinge 34 defining a hinge axis transverse of the hasp 20. The third segment of the hasp 20 includes an asymmetrical opening 36 extending therethrough in which the lengthwise dimension of the opening is longer than the transverse dimension of the opening and may be provided with straight inner and outer end edges 38 in parallel relation to each other and inclined side edges portions 40 in order to provide a uniquely shaped opening to move over a correspondingly shaped rotatable lock member 50 forming a part of the locking device 22 when the hasp is positioned in locked position.

Figure 2:
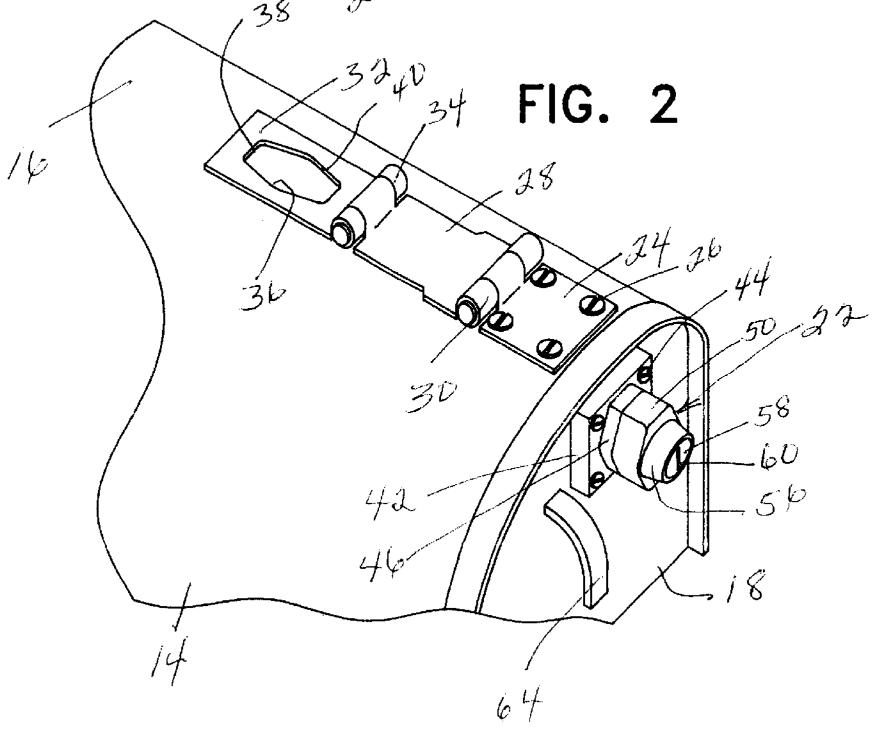
FIG. 2 is a perspective view of the mailbox lock with the three segments of the hasp oriented against the upper surface of the top portion of the mailbox and the lock member mounted on the upper front portion of the mailbox door being in unlocked position.

FIG. 2 illustrates the arrangement of all of the segments of the hasp when the door 18 is unlocked and unimpeded access can be gained to the interior of the mailbox 12 by a mail delivery person when all segments of the hasp are oriented in horizontal position against the upper surface of the mailbox. After the mail has been placed in the mailbox by the delivery person and the door 18 is closed, the second and third hasp segments 28 and 32 can be pivoted forwardly until the second segment 28 overlies the first segment 24 and the third segment 32 is pivoted downwardly toward a generally vertical position. The rotatable lock member 50 moves through opening 36 to the position illustrated in FIG. 1. In this position, the second segment 28 overlies the first segment 24 and protects the fastening devices 26 securing the first segment 24 to the mailbox 12 from access by tools or the like which could possibly be used to separate the hasp 20 from the mailbox 12. This arrangement makes removal of the hasp 20 from mailbox 12 difficult in the event someone wishes to gain access to the interior of the mailbox.

Figure 3:
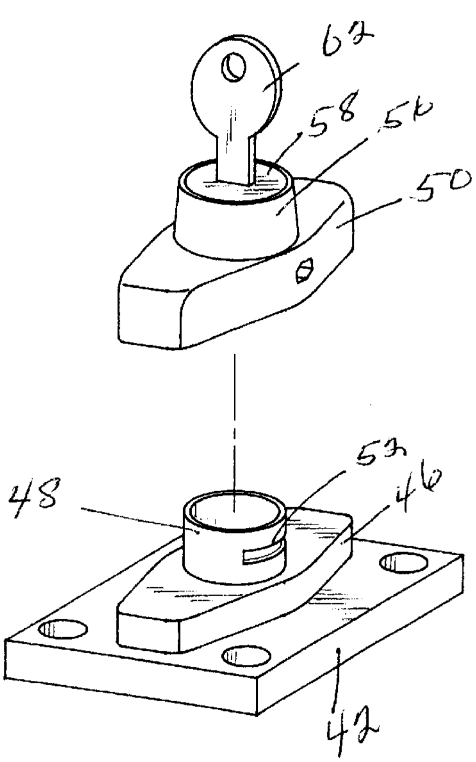
FIG. 3 is an exploded group perspective view of the anchor plate, post and rotatable lock member that is secured to the front surface of the mailbox door.
Figure 4:
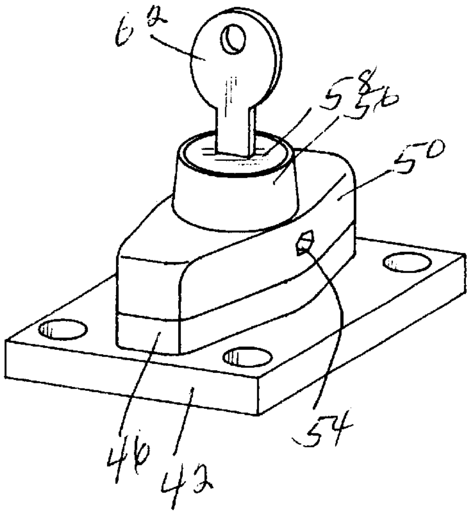
FIG. 4 is a perspective view of the structure of FIG. 3 illustrating the components in assembled position.
Figure 5:
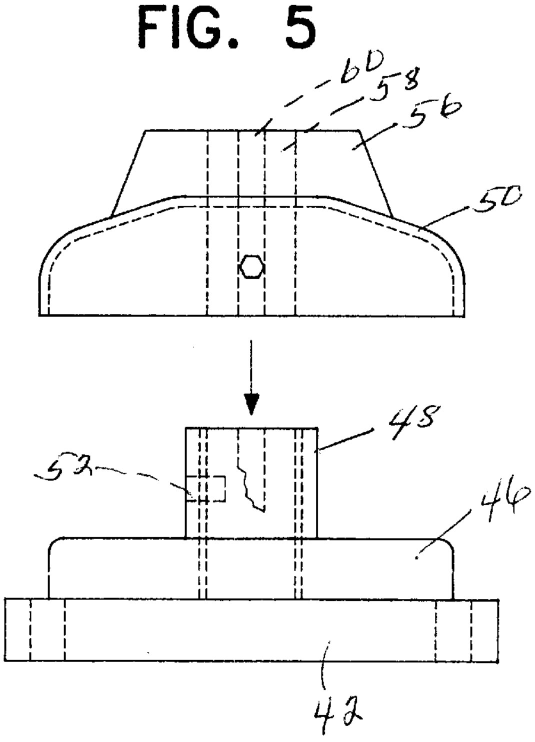
FIG. 5 is an exploded elevational view of the components of the lock illustrating their manner of assembly.

The locking device 22 includes a mounting plate 42 mounted on the exterior surface of the door 18 adjacent the upper edge by fasteners 44 or other securing devices such as epoxy, welding or the like. As illustrated in FIGS. 3–5, the locking device 22 also includes an asymmetrical projection 46 on the outer surface of the mounting plate 42 which corresponds to the configuration of the opening 36 in the third segment 32 of the hasp 20 so that the opening 36 in hasp segment 32 can be positioned in enclosing relation to the peripheral edge of the projection 46 and positioned adjacent the outer surface of the mounting plate 42 to conceal and protect fasteners 44 which secure mounting plate 42 to door 18. Projecting outwardly from the projection 46 is a generally cylindrical post 48 rotatably supporting the lock member 50 which also has the same shape, configuration and peripheral dimensions as the projection 46 as illustrated in FIG. 4 and as the opening 36 in the third segment 32 of the hasp 20.

The lock member 50 is rotatable in relation to the post 48 and when in the unlocked position as illustrated in FIGS. 1 and 4, the peripheral surfaces of the lock member 50 are in alignment with the peripheral surfaces of the projection 46.

In this position, the lock member 50 can extend through the opening 36 in the third segment 32 of the hasp 20 when the third segment 32 is pivoted downwardly to a vertical position over the lock member 50 and projection 46 so that the external surface of the third segment 32 is positioned slightly inwardly of the inner surface of the lock member 50. This enables the lock member 50 to rotate ¼ of a turn to a perpendicular relation to opening 36 and projection 46 and transversely of the third segment 32 of the hasp. In this position, the end portions of the lock member 50 will overlie and engage portions of both side edges of the opening 36 thereby retaining the third segment 32 of the hasp 20 against the mounting plate 42 with the periphery of the opening 36 aligned with the external surface of the projection 46.

The post 48 includes a laterally opening arcuate recess 52 for receiving a set screw 54, such as an Allen head screw, extending through a side wall of the lock member 50 to enable the lock member 50 to be removed. The recess 52 extends 90° to enable the lock member 50 to rotate ¼ turn in relation to post 48 between locked and unlocked positions. Also, the lock member 50 includes an upward projection 56 telescopically receiving post 48. A lock cylinder 58 rigid with projection 56 has a slot 60 therein receiving a key 62 enabling the lock member 50 to rotate ¼ turn in relation to post 48 from a locked position to an unlocked position. The lock cylinder 58 and the lock member 50 can rotate from an unlocked position to a locked position without the key 62 being inserted into the key slot 60 of locking cylinder 58. When the lock member 50 is moved to the locked position, the locking cylinder 58 locks the lock member 50 in the locked position so that it cannot be returned to an unlocked position without inserting and manipulating the key 62 in a well known manner.

The lock member 50 and post 48 are telescopically and rotatably related and the lock cylinder 58 in lock member 50 is rotatable in post 48. The lock cylinder 58 and post 48 include spring biased pins and tumblers as utilized in a conventional lock which are actuated by the key 62 in a well known manner to enable the lock cylinder 58 and the lock member 50 to rotate when the key 62 is inserted to move the lock member 50 from a locked to an unlocked position. When a mail delivery person approaches the mailbox with the hasp 20 in the position of FIG. 2, the door 18 can be opened by grasping and pulling handle 64. After mail is inserted and the door closed, the mail delivery person can then move the hasp 20 to the position of FIG. 1. The mail delivery person can then rotate lock member 50 ¼ turn since the pins and tumblers are misaligned in unlocked position and the key has been removed. When the lock member 50 is rotated ¼ turn, the pins and tumblers become aligned and the springs cause the pins and tumblers to extend across the shear line between the lock cylinder 58 and post 48 to prevent movement of lock cylinder 58 and lock member 50 to unlocked position until the key is inserted. The specific lock structure is not shown since it is conventional and well known.

If the hasp 20 and lock member 50 are mounted in a position where the normal spring friction latch is provided, a pull handle 64 may be attached to the door at any position alongside of or adjacent the lock member 50 in order to pivot the door between open and closed positions. If the hasp and lock member are mounted offset from the top edge of the mailbox and door, the conventional spring latch structure may be utilized to move the door between open and closed positions when the lock member is in unlocked position and the hasp is positioned along the outer surface of the mailbox.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination a rural mailbox having a generally horizontally disposed longitudinally elongated housing defined by a peripheral wall provided with an arcuate top surface and an open end, a closure door pivotally connected to said peripheral wall at a bottom edge of said open end, a mailbox lock selectively maintaining said door in closed relation to said open end of said wall, said mailbox lock comprising a three segment hasp mounted on said peripheral wall adjacent said open end, said three segment hasp including a mounting segment attached to said peripheral wall adjacent said open end by fasteners extending through said mounting segment and said peripheral wall, a fastener covering segment pivotally attached to said mounting segment at an end thereof remote from said open end of said peripheral wall in overlying protective relation to said fasteners extending through said mounting segment, said fastener covering segment of said hasp extending beyond an edge of said open end of said housing and beyond an edge of said door, and a door locking segment pivotally mounted on an end of said fastener covering segment outwardly of said door for overlying an outer surface of said door, and a lock member mounted on said door in releasable locking engagement with said door locking segment of said hasp to releasably retain said door locking segment in overlying relation to said outer surface of said door when said door is in closed position in relation to said open end of said peripheral wall, said door locking segment of the hasp including an opening, said lock member extending through said opening when said door locking segment is pivoted toward said door, said lock member being rotatably mounted on said door for rotation about an axis perpendicular to said door locking segment of said hasp to position said lock member in overlying engagement with a portion of said door locking segment outwardly of said opening for locking said door in said closed position, a support post projecting from and rigid with said door, said lock member including a key operated lock cylinder lockingly engaged with said support post, said lock member and lock cylinder being rotatable to an unlocked position when a key is inserted into said lock cylinder and rotatable from said unlocked position to a locked position without said key being inserted into said lock cylinder.

2. The combination as defined in claim 1, wherein said lock member telescopically receives said post, said post being cylindrical and rotatably supporting said lock member, said post including an arcuate recess, said lock member including an inwardly extending projection received in said recess to limit rotational movement of said lock member.

3. The combination as defined in claim 2, wherein said projection on said lock member is a removable set screw to enable removal of said lock member from said post when said set screw is removed from said recess.

* * * * *